US007850065B2

(12) United States Patent
Lederer

(10) Patent No.: US 7,850,065 B2
(45) Date of Patent: Dec. 14, 2010

(54) UNIVERSAL COLLECTION AND SUPPORT COLUMN FOR DIVERSE ELECTRONIC CANDLE ARRAYS

(76) Inventor: Gabor Lederer, 25 Madison Ave., Clifton, NJ (US) 07011

( * ) Notice: Subject to any disclaimer, the term of this patent is extended or adjusted under 35 U.S.C. 154(b) by 0 days.

(21) Appl. No.: 12/569,190

(22) Filed: Sep. 29, 2009

(65) Prior Publication Data

US 2010/0025458 A1 Feb. 4, 2010

Related U.S. Application Data

(63) Continuation-in-part of application No. 12/140,672, filed on Jun. 17, 2008, now Pat. No. 7,789,542, which is a continuation-in-part of application No. 11/846,946, filed on Aug. 29, 2007, now Pat. No. 7,695,171, application No. 12/569,190, and a continuation-in-part of application No. 11/254,428, filed on Oct. 20, 2005, which is a continuation-in-part of application No. 10/666,731, filed on Sep. 19, 2003, now Pat. No. 7,011,426.

(60) Provisional application No. 60/453,611, filed on Mar. 11, 2003.

(51) Int. Cl.
*B65G 11/04* (2006.01)

(52) U.S. Cl. ......................... 232/44; 232/1 D; 194/350; 70/416; 109/74

(58) Field of Classification Search ................. 232/1 D, 232/4 R, 15, 16, 43.2, 44; 194/202, 350; 109/47, 50–52, 64, 66, 74; 70/416–418
See application file for complete search history.

(56) References Cited

U.S. PATENT DOCUMENTS

| | | | | |
|---|---|---|---|---|
| 1,639,509 | A * | 8/1927 | Kaufman | 206/81 |
| 1,662,432 | A * | 3/1928 | Matre | 232/12 |
| 1,869,302 | A * | 7/1932 | Brosnan | 232/4 R |
| 5,465,909 | A * | 11/1995 | Roth | 232/1 D |
| 5,607,102 | A * | 3/1997 | Walsh et al. | 232/1 D |
| 6,920,835 | B1 * | 7/2005 | Johnson | 109/68 |
| 7,389,910 | B2 * | 6/2008 | Spencer | 232/4 R |
| 7,431,200 | B2 * | 10/2008 | Nordgren et al. | 232/44 |
| 2007/0230189 | A1 | 10/2007 | Gruenbacher et al. | |

* cited by examiner

*Primary Examiner*—William L. Miller
(74) *Attorney, Agent, or Firm*—Lackenbach Siegel, LLP

(57) ABSTRACT

A column alternatively supports one of a plurality of arrays of different pluralities candles in different configurations. A plurality of donation or payment mechanisms are mounted on the column for alternative modes of receiving diverse monetary transactions elements, such as cash, credit card and debit card, with resultant automated actuation of the at least one of the electronic candles upon receipt of one of the monetary transaction elements. The column includes jimmy-proof, pilfer-proof and tamper-proof features for securing cash collected in an authorized accessibly collection box. A replaceable paperboard collection box is removably disposed in the secured column.

16 Claims, 17 Drawing Sheets

UNIVERSAL COLLECTION AND SUPPORT COLUMN FOR DIVERSE ELECTRONIC CANDLE ARRAYS

PRIOR RELATED APPLICATIONS

This application is a continuation-in-part application of application Ser. No. 12/140,672, filed Jun. 17, 2008, now U.S. Pat. No. 7,789,542 which is a continuation-in-part application of Ser. No. 11/846,946, filed Aug. 29, 2007, now U.S. Pat. No. 7,695,171, granted Apr. 13, 2010; a continuation-in-part of application Ser. No. 11/254,428, filed Oct. 20, 2005, which is a continuation-in-part of application Ser. No. 10/666,731, filed Sep. 19, 2003 now U.S. Pat. No. 7,011,426, which claims priority to Ser. No. 60/453,611, filed Mar. 11, 2003, now U.S. Pat. No. 7,011,426; and a continuation-in-part of application Ser. No. 11/846,946 filed Aug. 29, 2007 now U.S. Pat. No. 7,695,171, to which related applications priority is claimed and are incorporated herein in their entireties by reference thereto.

BACKGROUND OF THE INVENTION

1. Field of Use

This invention relates to electronic candles. This invention also relates to a universal assembly for diverse arrays of electronic candles. This invention also relates to a universal construction for diverse payment modes for electronic candles for prescribed periods of time. This invention also relates to an electronic candles array that provides for universal modes for collecting payments for illuminating electronic candles for prescribed periods of time. This invention also relates to individualized payment or collection models for diverse users and customers, particularly diverse religious institutions, funerary businesses, cemeteries and memorial establishments.

2. Discussion of the Background and Prior Art

Traditionally, wax candles, such as votive candles and tapers, have been used for memorialized and devotional purposes. Religious institutions generally provide for the purchase and lighting of the wax candles. Purchasers of the candles would make a donation of a desired or recommended amount, which amount is usually deposited as cash in a collection box in order to acquire and light the wax candle.

Wax candles produce pollutants and soot, are a fire hazard. Insurance is costly where wax candles are in general use. The candle art turned to electronic candles, in which the user would touch or turn-on a candle to illuminate the electronic candle. Examples of electronic candles are disclosed in U.S. Pat. No. 6,066,924, U.S. Pat. No. 6,017,139, U.S. Pat. No. 5,863,108, U.S. Pat. No. 4,617,614 and U.S. Publication No. 2004/0179355 to Gabor Lederer, the inventor of the present invention.

The art directed to user-purchaser illumination provides the improvement of placing a motion sensor in the collection box. The motion sensor senses any object deposited into the collection box. A user, by merely inserting a coin, bill, or piece of paper or any object in the collection box can effect actuation of a selected electronic candle for illumination. The cash collected in the prior art construction is subject to pilfering. This prior art collection does not adequately control the payment for the illumination, and was unsatisfactory as a practical business for the religious or like institution. The prior art collection construction is not cost-effective to the manufacturer, particularly for diverse religious institutions, funerary business, cemeteries and memorial establishments The prior art cash collection or donation constructions were not sufficiently tamper-proof or pilfer-proof.

The art directed to the commercial illumination of electronic candles desires a universal and yet practical cost-effective system for providing diverse arrays of electronic candles to accommodate diverse locales, modes, diverse payments for diverse religious institutions, funerary businesses and internment and memorial establishments. The foregoing institutions, establishments, and businesses also desire a secured construction for the collected cash.

The art related to the manufacture of electronic candle assemblies is desirous of minimizing manufacturing costs, and yet provide assemblies to diverse religious, funerary and memorial customers. The manufacturer thus desires a cost-effective readily customizable electronic candle assembly.

It is a principal object of the present invention to provide an universal assembly for diverse electronic candle arrays.

It is a principal object of the present invention to provide an assembly as aforesaid for diversely configured electronic candle arrays.

It is another principal object of the present invention to provide an assembly as aforesaid having one or more diverse monetary transaction modes.

It is another principal object of the present invention to provide a cash collection assembly having anti-jimmy, anti-pilfer and anti-tamper features.

It is still a further object of the present invention to provide for the accumulation and removal of collected cash which cash is securely disposed in the aforesaid assembly.

It is still a further object of the present invention to provide an electronic candle and payment collection assembly as aforesaid which is readily manufactured and selectively assembled, and yet is of practical design and construction.

The present invention achieves the foregoing objects and provides a practical cost-effective solution to the aforesaid needs for the commercial illumination of electronic candles art as well as for the electronic candle assembly manufacturing art.

The terms "monetary transaction", "payment transaction" or "donation transaction" refers to any means or element utilized to effect a transfer of a monetary value such as by cash, credit card, debit card or otherwise.

SUMMARY OF THE INVENTION

The invention, in one aspect, is a universal support column for selectively mounting one of a plurality of differently configured arrays of electronic candles.

The invention, in another aspect, is a support column for electronic candles having a plurality of modes for different transaction payment or collection mechanisms and in which cash collections are secured. The invention, in still a further aspect, provides for the illumination of one of the electronic candles for a time period commensurate with the making of a prescribed donation or payment.

The invention, in still another aspect, provides a pilfer-proof construction for the secure collection of cash and the then ready authorized removal of the secured accumulated cash from a readily replaceable collection box removably disposed in the support column.

The invention, in a more specific aspect, is a jimmy proof cash collection assembly that includes an elongate column comprising a front panel having opposed side walls, opposed side panels and a back panel, a paperboard collection box, and wherein the column includes a receptacle space for holding the collection box, and a movable front panel so that the front panel moves from an open position to a closed position with the collection box being removably disposed inside the column in the closed position. The collection box is removably disposed in the receptacle in the column. The front panel has side panels and side walls with elongate U-shaped channels that slidably engage oppositely disposed planar side portions to enclose the column with the collection box securely in place. A lock secures the front panel to the column. The lock is hidden to frustrate tampering. A jimmy-proof and tamper-proof construction is thereby provided.

The invention, in still another aspect, is a collection box formed of cardboard or paperboard construction which is secured in and readily replaceably removable from the support column by a person authorized to unlock the column construction.

DESCRIPTION OF THE INVENTION

Figure 1:
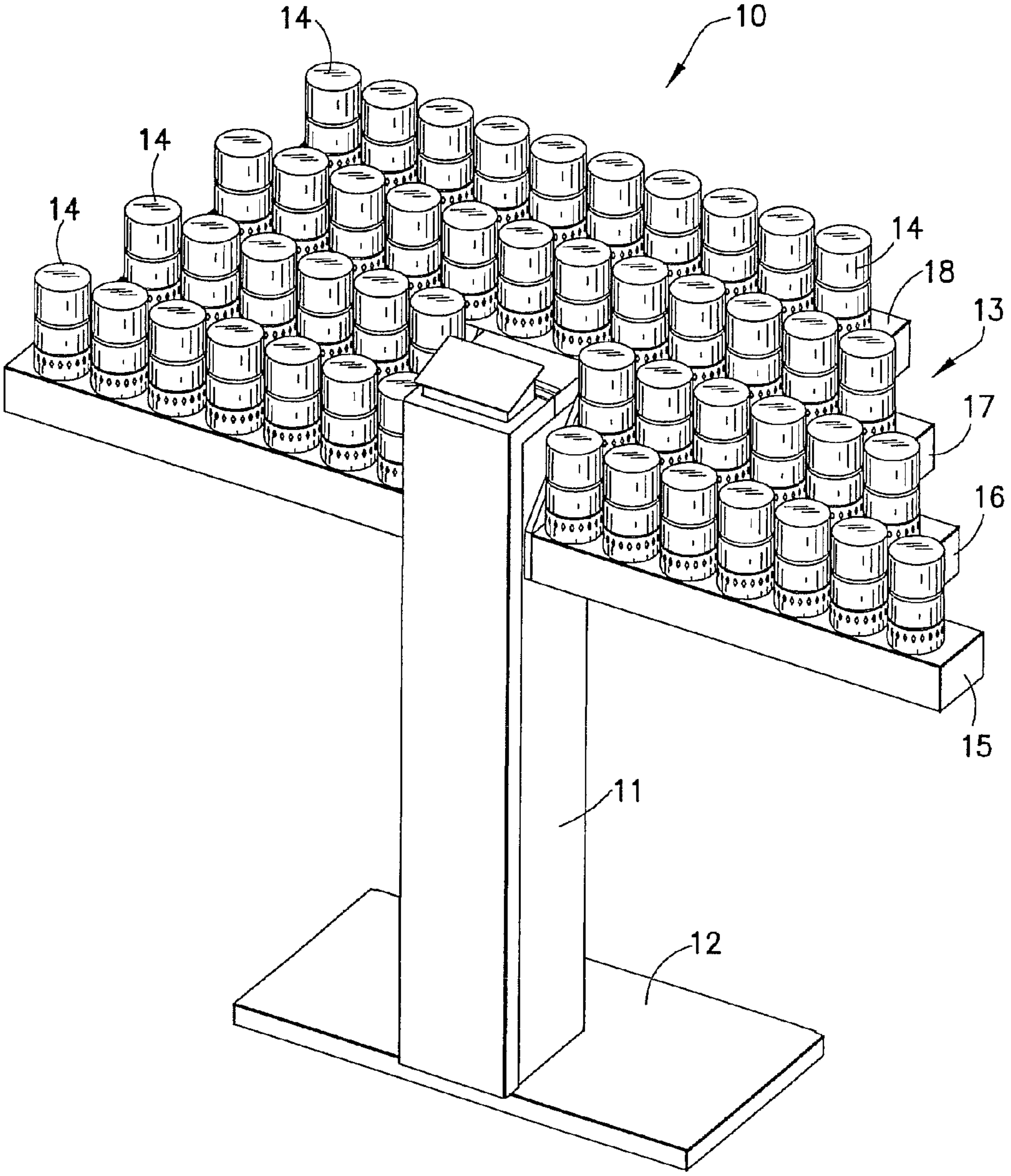
FIG. 1 is a front perspective view of a first embodiment of the invention.

Referring to FIG. 1, there is shown a first embodiment of the universal collection support column and electronic candle array 10. Embodiment 10, in general terms, includes a support column 11 fixedly mounted to support base 12, and further includes a first electronic candle array 13 removably mounted to column 11, as will be further discussed hereinafter.

Array 13 includes a plurality of electronic candles 14 (typical). Electronic candle 14 may be of the construction as shown and described in Ser. No. 11/846,946, filed Aug. 29, 2007, to Lederer, the inventor herein, which application is incorporated herein in its entirety by reference thereto. Electronic candles 14 are mounted on transversely disposed support members 15, 16, 17 and 18. The support members provide rows of electronic candles 14, with decreasing numbers of candles in each row extending rearwardly from member 15 to member 18. In this manner of construction, the electronic candles 14 and support members 15-18 are angularly disposed so as to subtend a rearwardly disposed 90° angle. Array 13, in this 90° configuration, is particularly suitable for juxtaposition in a corner or alternatively against a planar wall.

Figure 5:
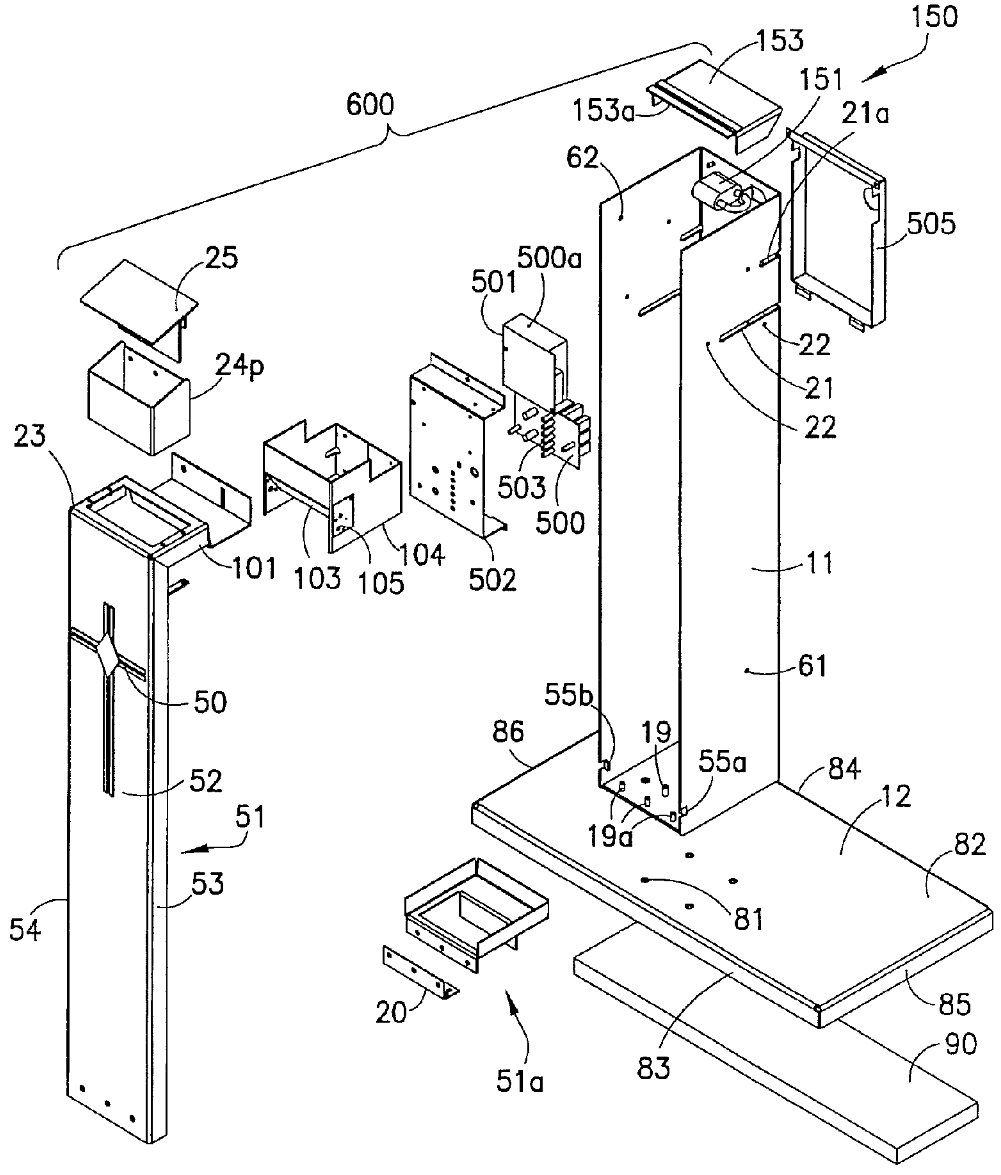
FIG. 5 is a front perspective exploded view of the universal support column.
Figure 6:
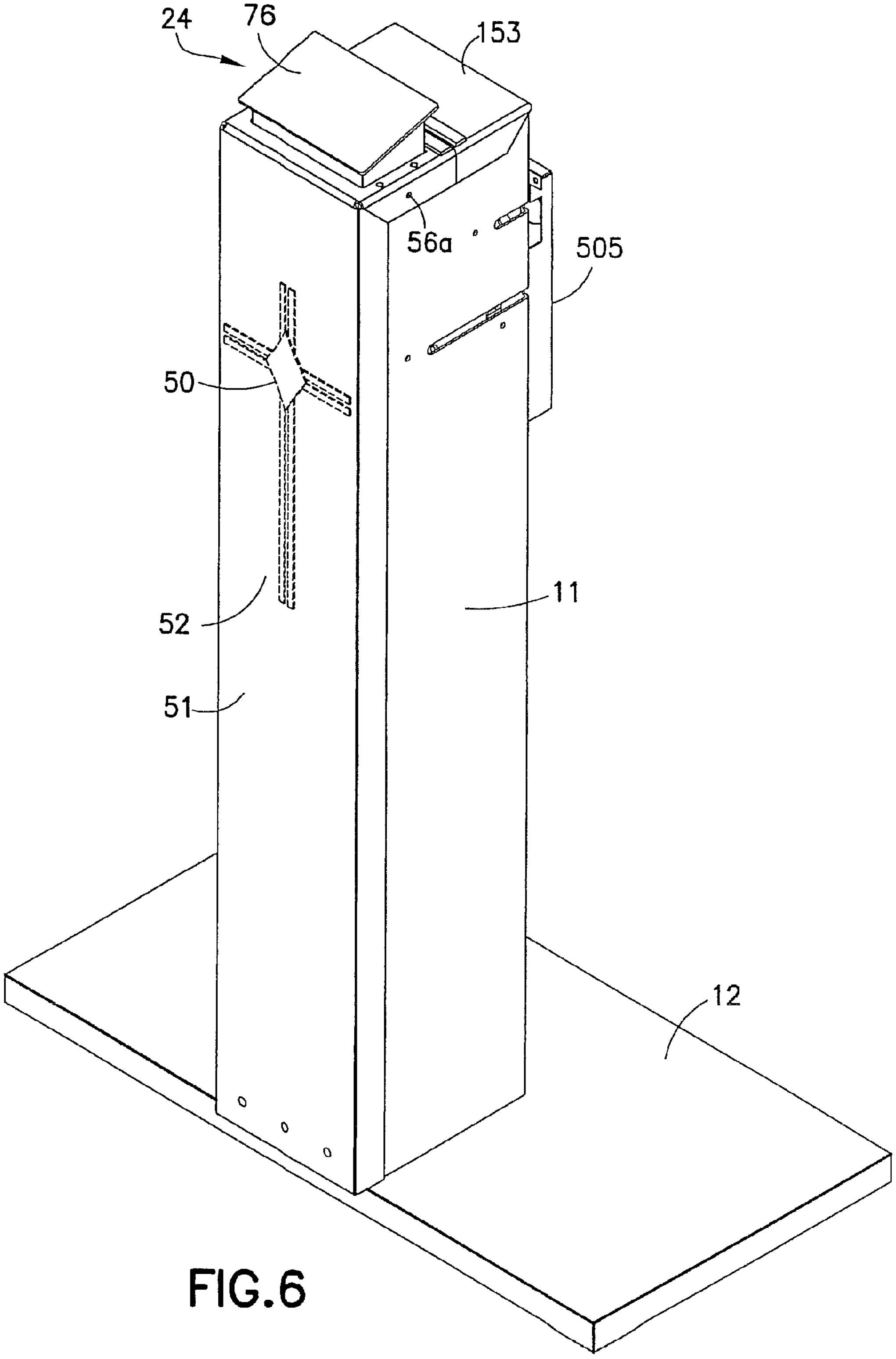
FIG. 6 is a front perspective view of the universal support column as shown in FIG. 5 in the closed position.
Figure 7:
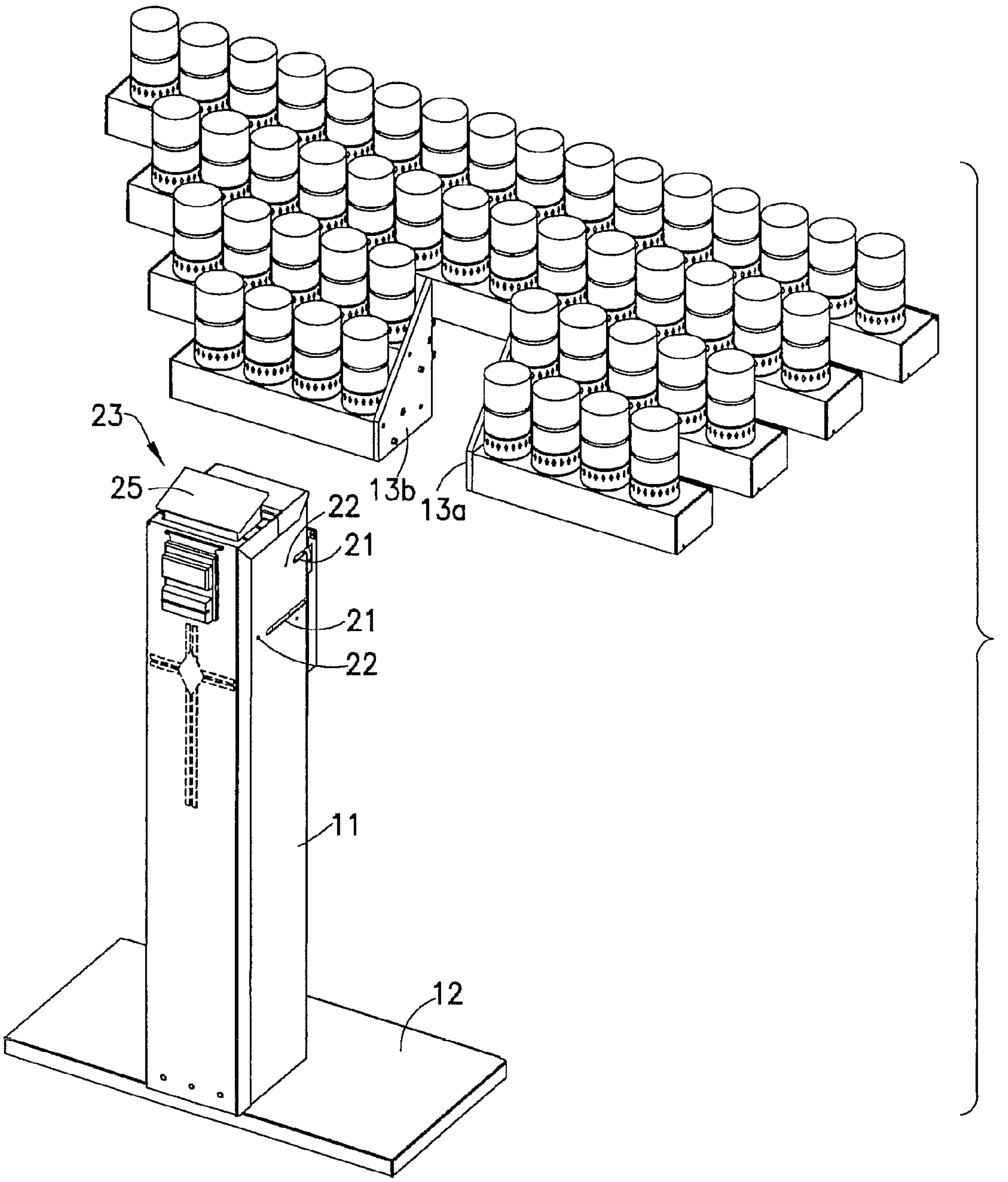
FIG. 7 shows the universal support column of FIG. 6 with one candle array in the pre-assembly mode.

Column 11 has a lower portion which is fixedly mounted to base 12. Column 11 has an upper portion, which includes mounting slots 21 and holes 22 for disconnectably mounting candle array 13, as at 13*a*, as well as other differently configured arrays as will be more fully discussed hereinafter (FIGS. 5 and 7).

Column 11 includes a front top 23 with a cash or bill receiving assembly 24. Assembly 24 includes pivotally mounted hinged lid assembly 25. Assembly 24 is of a tamper-proof or pilfer-proof or tamper-proof construction (FIG. 5). A cash receiving lid assembly is disclosed in U.S. Publication No. 2004/014596, published Aug. 5, 2004 to Lederer, the inventor herein, which published application, is incorporated herein in its entirety by reference thereto.

Figure 2:
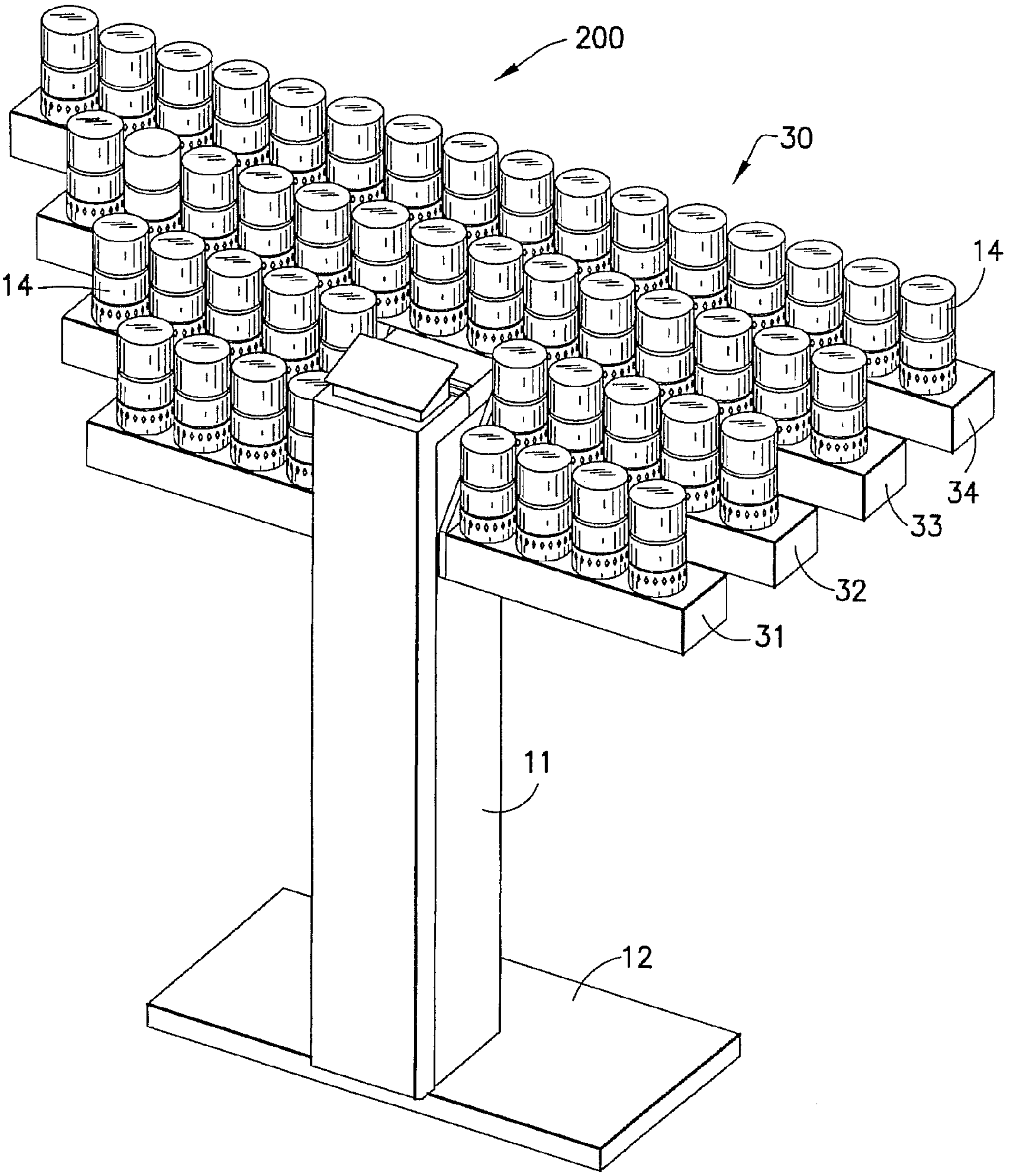
FIG. 2 is a front perspective view of a second embodiment of the invention.

Referring to FIG. 2, there is shown a second embodiment 200 of the universal collection and support column having candle array 30. Embodiment 200 includes the column 11 and base 12 as in embodiment 10, but has a different electronic candle array 30. Candle array 30 includes transversely disposed members 31, 32, 33 and 34. Electronic candles 14 are mounted on members 31-34. Array 30 subtends a forwardly disposed 90° angle which is reverse to that in embodiment 10. In this manner of construction, array 30 may be disposed on a planar wall, with more ready access to the rearwardly disposed candles, namely the candles mounted on members 33-34 than the rearwardly disposed candle of embodiment 10.

Figure 3:
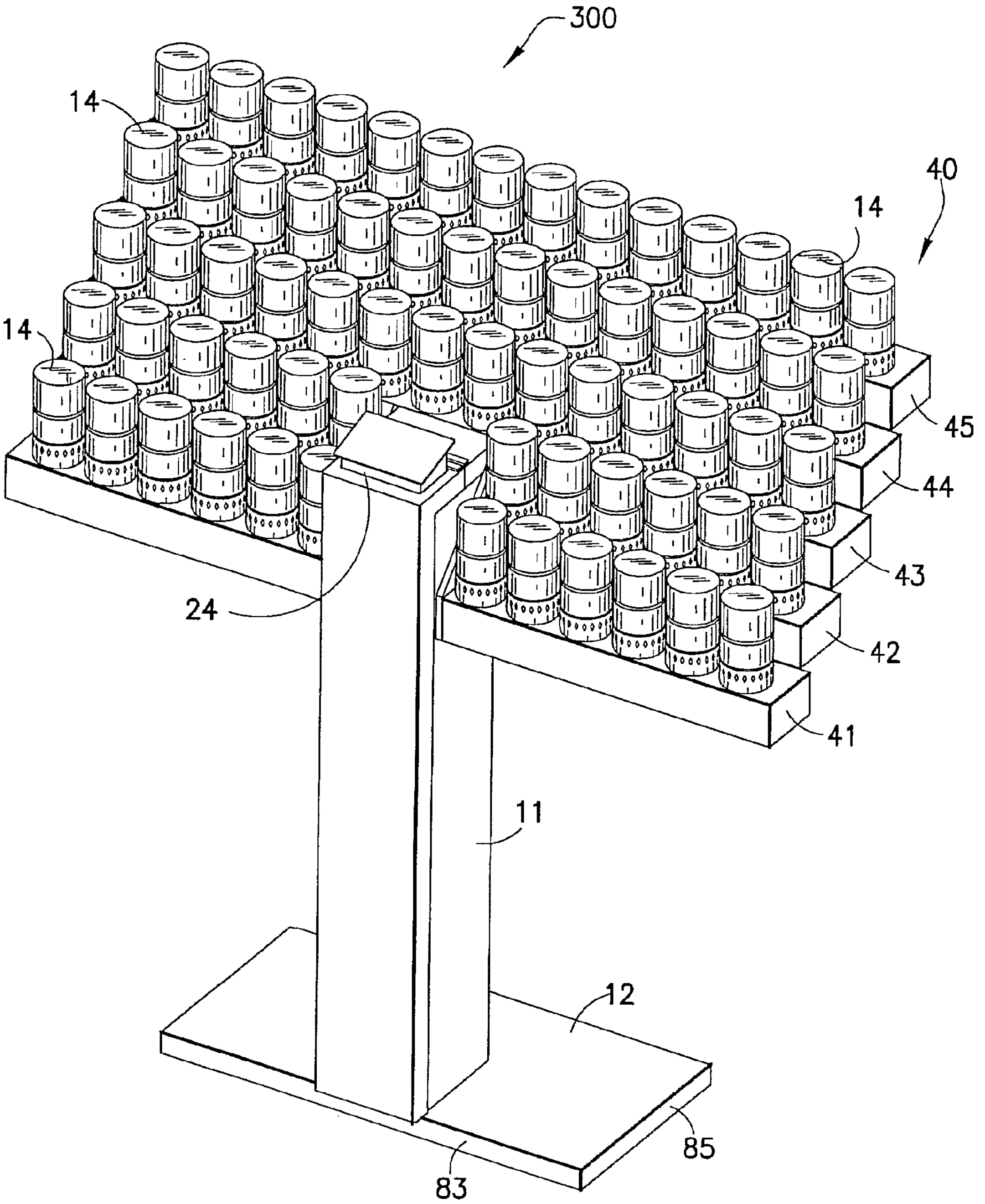
FIG. 3 is a front perspective view of a third embodiment of the invention.

Referring to FIG. 3, there is shown a third embodiment of the universal collection and support column and candle array 300. Embodiment 300 includes support column 11, base 12 and collection assembly 24 as in embodiments 10 and 200. Embodiment 300 has electronic candle array 40. Array 40 includes five transversely disposed members 41, 42, 43, 44 and 45 with candles 14 mounted thereon. There is the same number of candles 14 in each of the five members 41-45. Array 40 is particularly suited to be mounted adjacent a planar wall, with back member 45 abutting the wall (not shown). Embodiment 300 provides a relatively large number of operable candles in one array 40.

Figure 4:
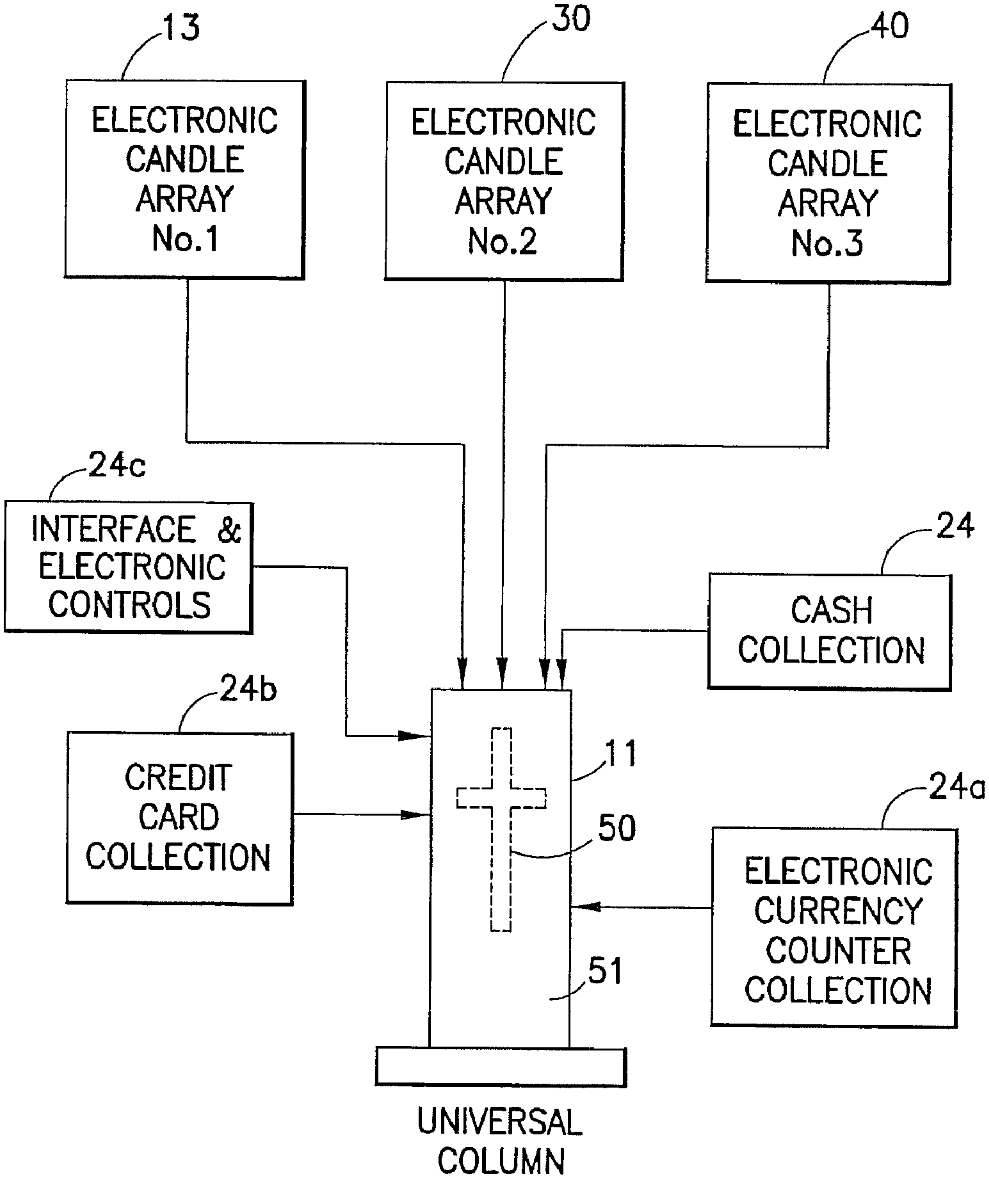
FIG. 4 is a block diagram of the system of the present invention.
Figure 15:
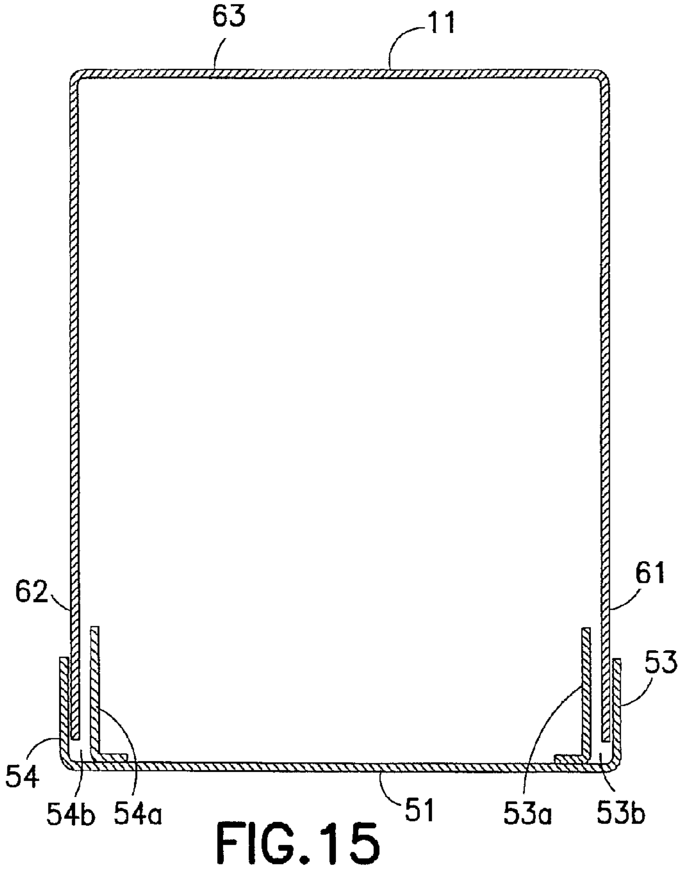
FIG. 15 is a top plan sectional view of the front panel enclosing the universal support column taken along the lines 15-15 of FIG. 9.

Referring to FIGS. 4 and 5, there is shown universal support column 11 with the modification of a religious symbol, namely a Cross 50 formed in or mounted on the front 52 panel 51. It is to be understood that while panel 51 bears a Cross 50, other religious symbols e.g. a Star of David, as well as other indicia of significance to end user are within the contemplation of the invention. Front door or panel 51 includes outer sides 53 and 54, bottom 55 and top 56 (FIGS. 4-14). Front panel 51 is pivotably hinged by pivot hinge 20 to column 11 as at 57 with connecting holes in slidable pivot bracket 51*a* and connector elements 19*a* respectively. When panel 51 is pivoted to the closed position, flanges 55 of panel 51 engage column stop 55*a* and 55*b* (FIGS. 5 and 14) Column 11 includes side panels 61 and 62, and back panel 63. Front panel 51 includes vertically disposed elongate L-shaped flanges or members 53*a* and 54*a* which form respective channels 53*b* and 54*b*. In this manner of construction, front panel 51 pivots so that panel sides 53 and 54 and inner sides 53*a* and 54*b* slidable engage respective side panels or column sides 61 and 62 so that the sides 61 and 62 are disposed in channels 53*b* and 54*a* in the column enclosed position (FIGS. 14 and 15) to enclose the column in a jimmy-proof construction. The channels 53*b* and 54*b* and sides 61 and 62 construction may be reversed from that as shown. Front panel top 53 including sides 56*a* and 56*b* cover the top edges 64 and 65 of respective column sides 61 and 63, to further provide an enclosed column. Panel 51 extends forwardly of base 12 to provide clearance for the panel to be pivoted away from column 11 by pivot hinge 20. Column assembly 11, including front panel 51, is formed of sheet metal construction by means well known in the metal construction arts.

Figure 8:
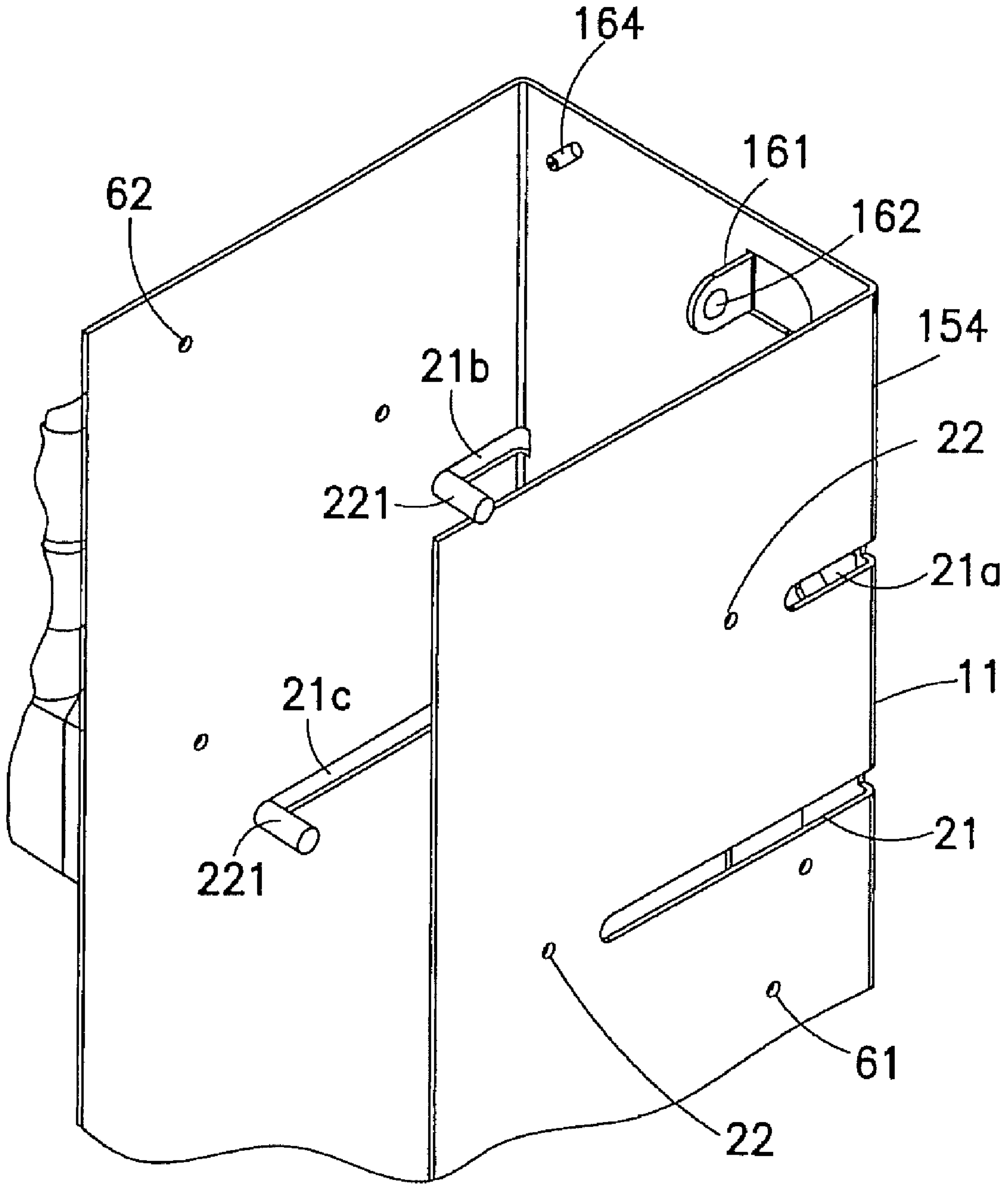
FIG. 8 is an enlarged fragmentary front perspective of the upper rear portion of the universal support column.
Figure 9:
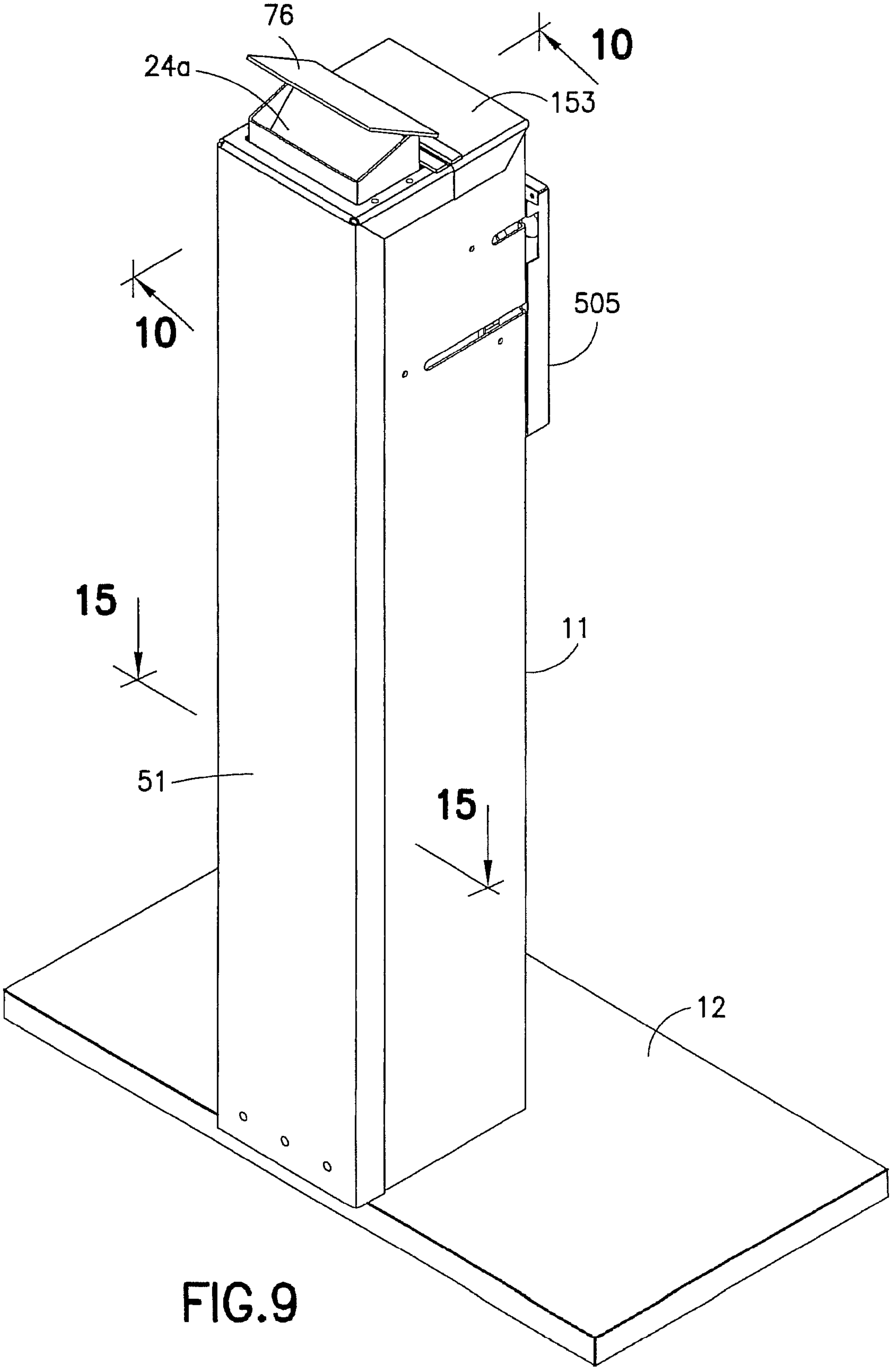
FIG. 9 is a front perspective view of the universal support column.

Referring specifically to FIG. 8, there is shown the rearward top corner of column 11. Column 11 sides 61 and 62 have slots 21, 21*a*, 21*b* and 21*c*, and holes 22 (typical). Pins 221 (typical) slidably engage slots 21-21*c*. Arrays 13, 30 and 40 have similar plate mounting features.

Figure 10:
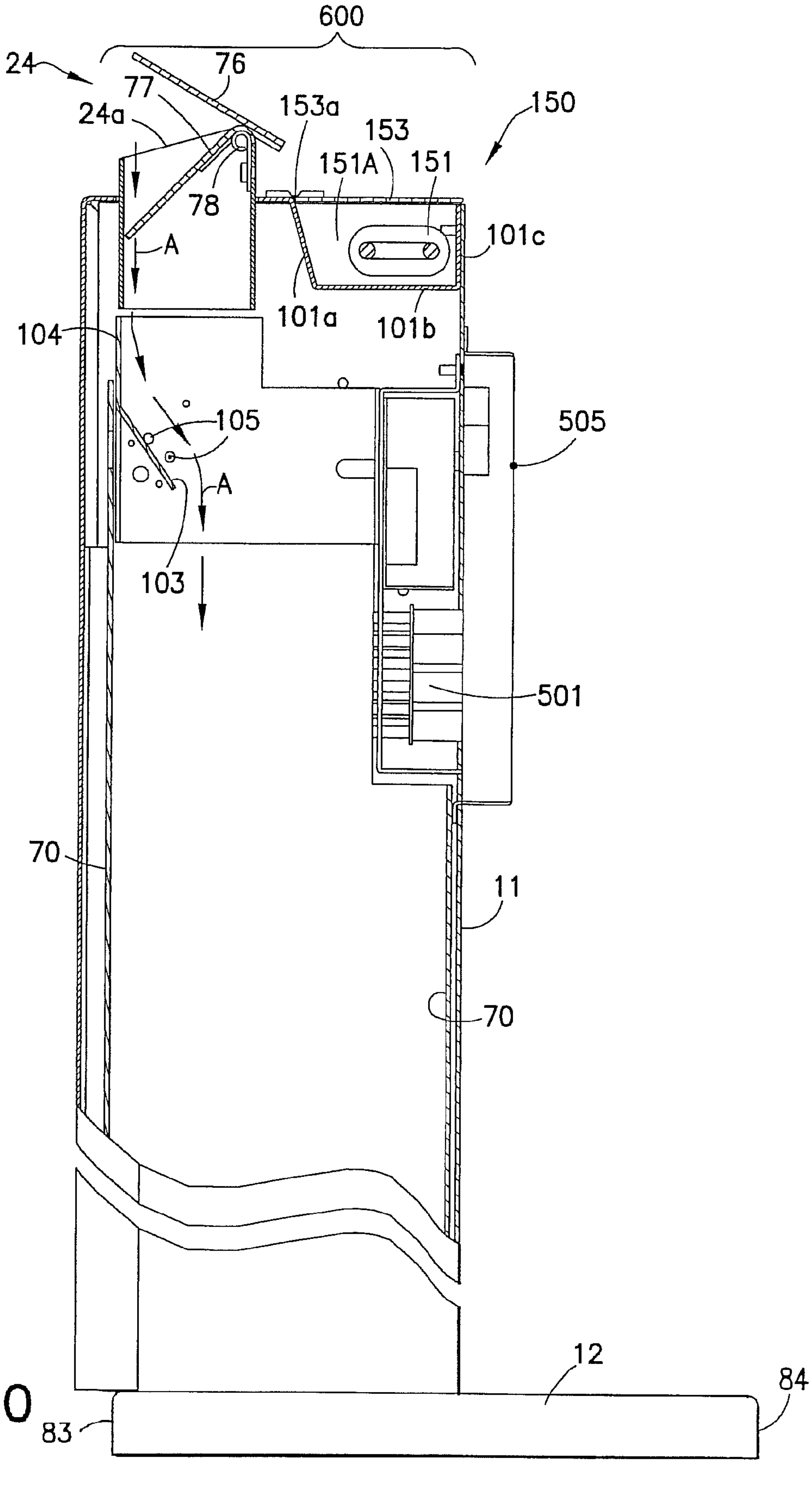
FIG. 10 is an enlarged sectional view taken along line 10-10 of FIG. 9.
Figure 11:
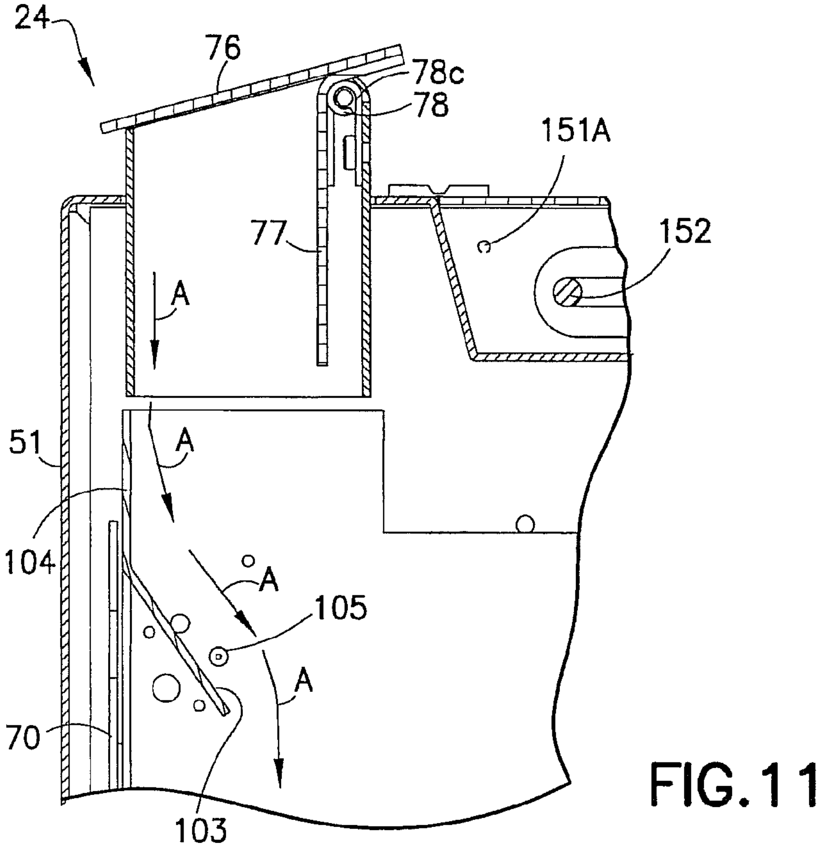
FIG. 11 is a further enlarged fragmentary sectional view of the cash receiving assembly as shown in FIG. 10 with a broken line view showing the cash receiving assembly in the open position.
Figure 12:
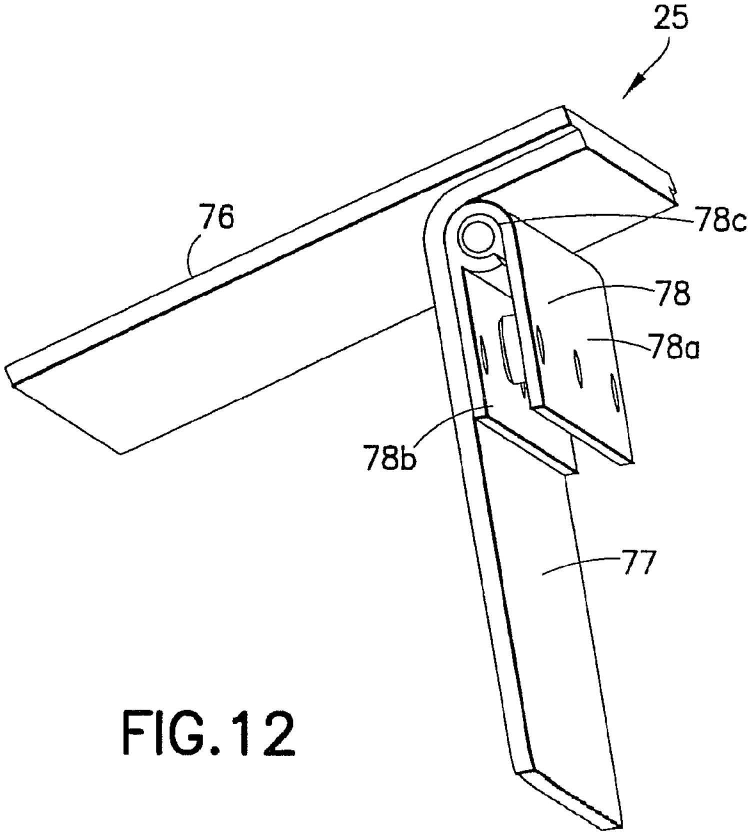
FIG. 12 is an enlarged perspective view of the pivot hinged dual lid anti-tampering construction 11.
Figure 13:
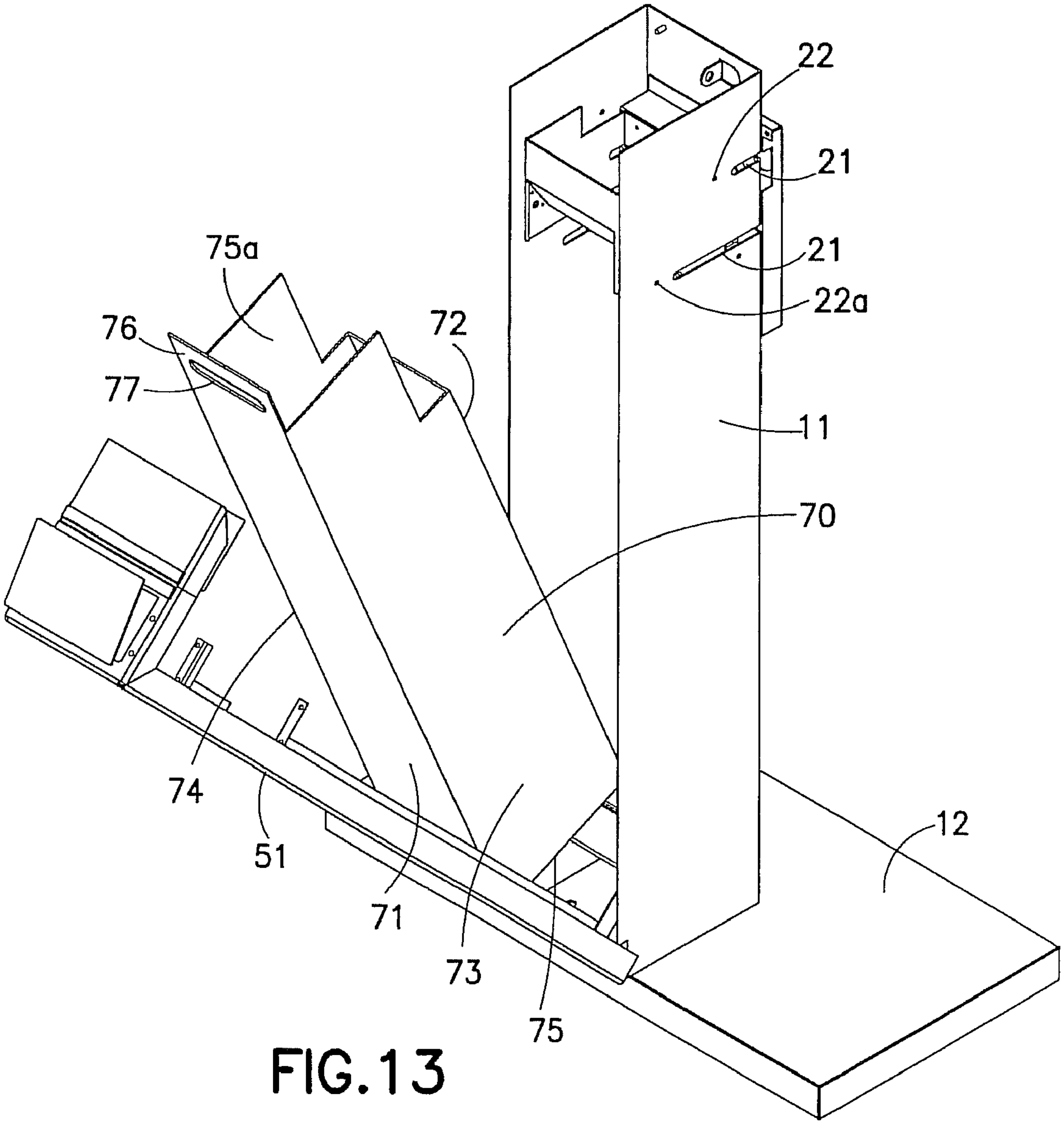
FIG. 13 is a perspective assembly view of the universal support column and collection box with the front panel pivoted open.
Figure 14:
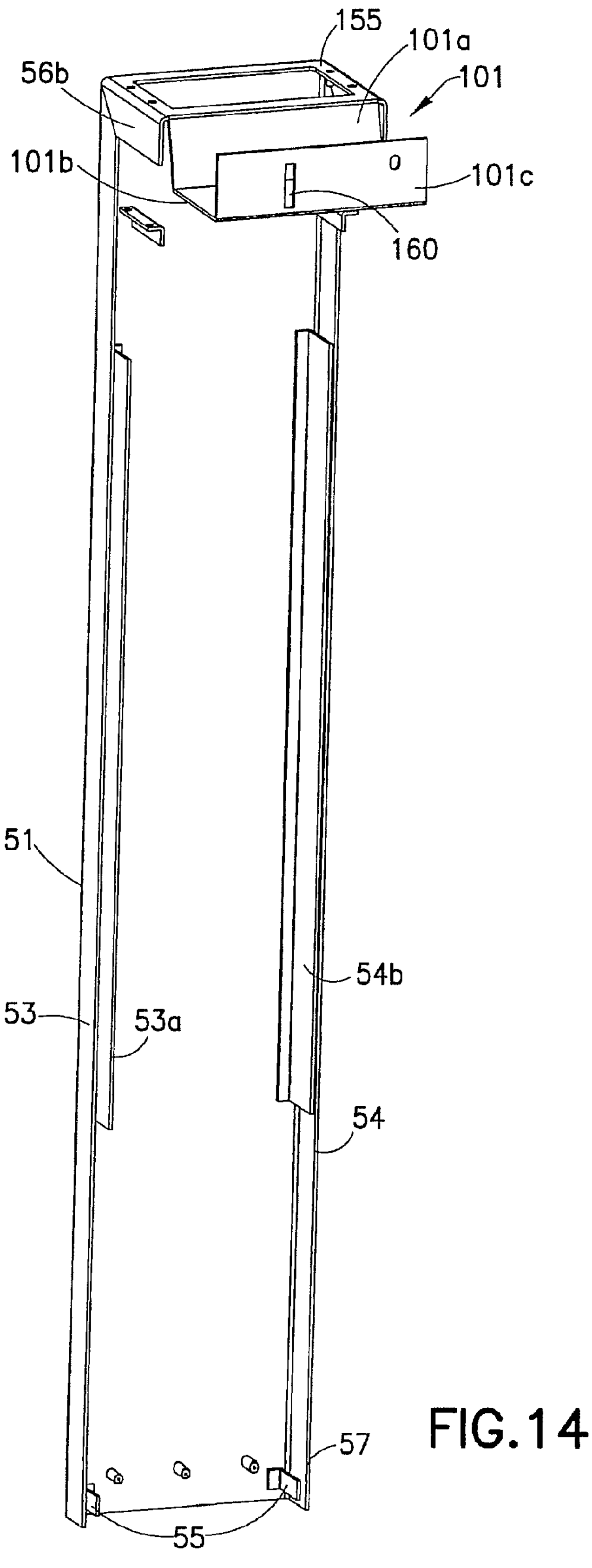
FIG. 14 is a rear perspective view of the front panel of the universal support column.

Referring to FIG. 13, front panel 51 is respectively shown pivoted rearwardly and forwardly from column 11. A fiberboard or cardboard collection box 70 is removably disposed in column 11 when the column enclosed by front panel 51. As best shown in FIG. 13, collection box 70 is readily available for removal from column 11 with the forward pivoting of front panel 51. Front panel 51 is pivoted about 30° and is controlled by bracket 51*a* and stops 55*a* and 55*b* in sides 61 and 62 (FIG. 5). Collection box 70 includes a front 71, back 72, opposed sides 73 and 74 and bottom 75 of folded cardboard or fiber board construction. Collection box 70 is open at the top 75*a* for receiving cash, bills or notes through the cash receiving assembly 24, as further described hereinafter. Front 71 of collection box 70 is formed with an upwardly extending flange or portion 76, having transverse cut-out 77. Cut-out 77 serves as a handle for lifting collection box 70 out from column 11. Collection box 70, when installed in the enclosed column 11, is disposed below and in communication with the cash receiving assembly 24 and chute assembly 104, as best shown in FIGS. 10-12. Chute assembly 104 includes photo sensor boards 105 and cash deflection plate 103. In this manner of construction, cash receiving assembly 24 and particularly lid assembly 24, and more particularly upper lid 76 is pivoted upwardly and the cash is deposited on lower lid 77. Lower lid 77 in this position is surrounded by sleeve 24*p*. Hinge 78 by the weight of lids 76 and 77 causes conjoined lids 76 and 77 to pivot downwardly so that the cash slides off lid 77 and falls freely into collection box 70. Assembly 24 provides a pilfer-proof construction. Collection box 70 is then locked and secured within closed column 11, as will be more fully explained hereinafter.

Referring to FIG. 4, there is shown the overall assembly and methodology of the present invention. Universal column 11 supports, in a like manner, one selected array 13, 30 and 40. Universal column 11 also mountably includes one or more of the monetary transaction assemblies 24, 24*a* and/or 24*b*, as well as electronic interface and control circuits 24*c*. In this manner of construction, the manufacturer can cost-effectively manufacture an assembly customized for any particular religious, funerary, memorial or cemetery business.

Referring to FIGS. 5 and 10-12, there is shown cash or bill receiving assembly 24 and sub assembly 25. Sub-assembly 25 includes pivoted co-joined lids 76 and 77. Hinge 78 includes legs 78*a* and 78*b*, and interconnecting shaft or rod 78*c*. Legs 78*a* and 78*b* are mounted on shaft or rod 78*c*. Leg 78*a* is fixedly mounted to sleeve 24*p*. Leg 78*b* is fixedly mounted to lid 77 as at 77*a*. Legs 75*a* and 78*b* are U-shaped in sub-assembly 25 closed position and V-shape in the assembly 25 open position (FIG. 10). Sleeve 24*p* and assembly 25 are mounted to the front panel 51 top position 23 at opening 101.

In the aforesaid manner of construction, the user lifts lid 76 and in doing so extends hinge element 78*c*. An opening or slot 24*a* is formed between the lifted lid 76 and the column 11. The user deposits cash as a bill or coin through slot 24*a*. The e.g. bill falls freely as shown by arrow A. A deflection plate 103 extends rearwardly from the front of the column. Deflection plate 103 is integral with assembly 104. Deflection plate 103 causes the bill (not shown) to be directed and deposited into the collection box 70. An electronic sensor 105 senses the movement of the bill (or other deposited item) and sends signals to the interface and electronic control unit 24*c* to actuate the unlit electronic candles. The user then depresses a selected electronic candle for illumination. The actuation and illumination mechanisms are more fully discussed in present applicant's U.S. Ser. No. 11/846,946, filed Aug. 29, 2007, which application is incorporated herein in its entirety by reference thereto.

The user, after depositing the cash, releases lid 76. Hinge 78 then moves with and causes lids 76 and 77 to pivot downwardly and return to the closed or rest position. It is important to note that the lifted upward disposition of lid 76 with the juxtaposition of lid 77 prevents or blocks the user or others from reaching downwardly with an elongate tool in an effort to pilfer the cash accumulated in collection box 70 (FIG. 11).

Figure 20:
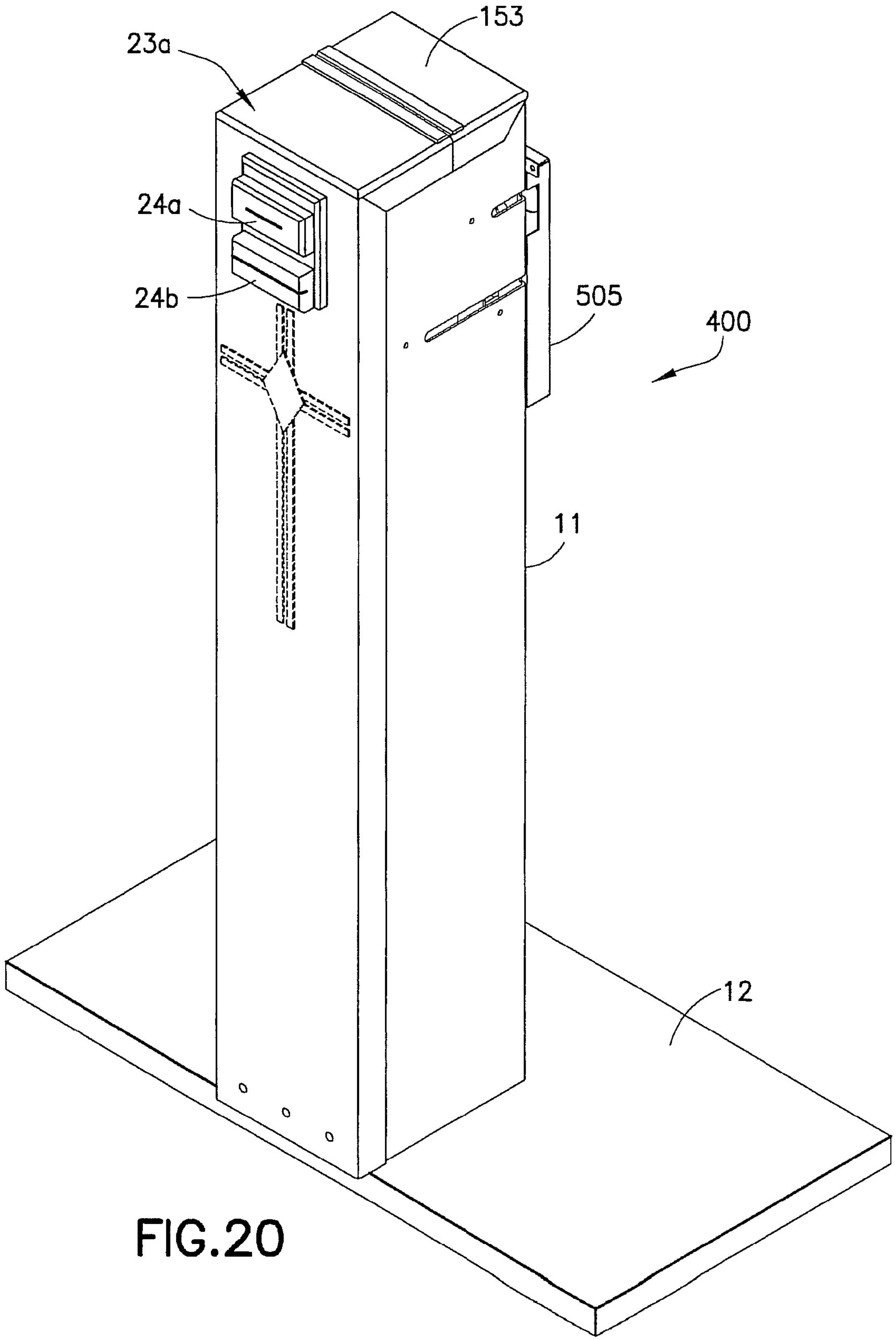
FIG. 20 is a front perspective view of a further embodiment of the universal support column.

Referring to FIGS. 5, 9, 10, 11, 13, 14 and 16, there is shown security lock overall assembly 600 and particularly lock securing assembly 150 with padlock 151. Padlock 151 is surrounded and hidden by hinged top door 153, front panel 101*a*, bottom panel 101*b*, back or distal panel 101*c* of panel assembly 101 and column side panels 61 and 62. Lock 150 cover 153 is pivotably disposed by hinge 153*a*. Panel assembly 101 includes a proximately disposed top portion 155 having rectilinear slot 156 to receive fixedly connected sleeve 24 in which cash receiving assembly 25 is operably mounted. A thumb nut (not shown) secures front panel 51 to column back panel 63. Vertically disposed slot 160 is formed in upright back portion 101*c*. Back portion 101*c* is facingly disposed to the upper portion of column back or distal panel 63. Panel 63 is formed with an inwardly disposed tongue or hasp 161 which is disposed at a right angle to back panel 63. Tongue or hasp 161 includes circular hole 162. Tongue 161 is sized to be slidably disposed in slot 160. In this manner of construction, front panel 51 with assembly 101 is pivoted rearwardly so that tongue or hasp 161 engages slot 160. Lock 151 prong then engages hole 162. The front panel assembly and column are locked by lock 151. This completes lock securing assembly 150. This lock construction secures the column to further render the column tamper-proof. Cover 153 when closed provides a flush unitary construction appearance (FIG. 20). Each array 13, 30 and 40 when mounted, the column is disposed on three sides of the cover to provide limited access to the cover. Cover 153 hides lock 151. Lock 151 is disposed in a confined well or space 151A (FIG. 11). The confined space 151 A of lock 151 frustrates attempted use to break into the column. The hidden lock further frustrates attempts to locate a lock. In addition, front panel 51 sides and flanges 53-53*a* and 54-54*b* engage column sides 61 and 63 in the lock secured column. This construction prevents an attempted jimmying or tampering. The combination of the afore-discussed several security features provide a highly secure construction for cash accumulated in collection box 70.

Referring to FIG. 20, there is shown a further embodiment 400 of column 11. In this further embodiment 400, the front panel assembly 51 at top 23*a* does not include a cut-out for and access to a collection box assembly. Embodiment 400 includes payment or collection transaction modes 24*a* and 24*b*. Transaction mode unit 24*a* is a bill acknowledgement and value or denomination determination collection unit as is well known in vending machine usages. One such bill acceptor is the MEI AE2600 multi-wave optical bill validator, manufactured by MEI, West Chester, Pa. 19350. Transaction mode unit 24*a* is operably connected to the candle actuation assembly. Transaction mode unit 24*b* is a credit card swipe unit which is well known for making an automated payment or transaction by credit or debit card. The automated donation or payment in turn permits automated charitable donations and to the extent where appropriate. The use of a credit/charge card in an automated transaction to contribute to a selected charity are disclosed in U.S. Pat. No. 5,466,919, granted Mar. 14, 1995 and U.S. Pat. No. 5,897,273, granted Mar. 23, 1999, which patents are incorporated herein by reference thereto.

Figure 17:
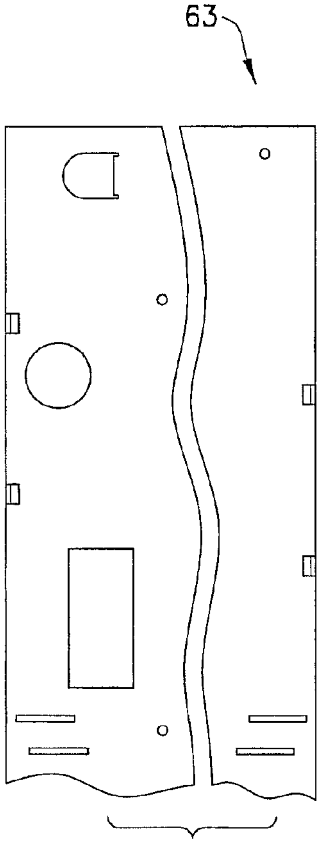
FIG. 17 is a rear elevational view of the upper portion of the back of the universal support column.
Figure 18:
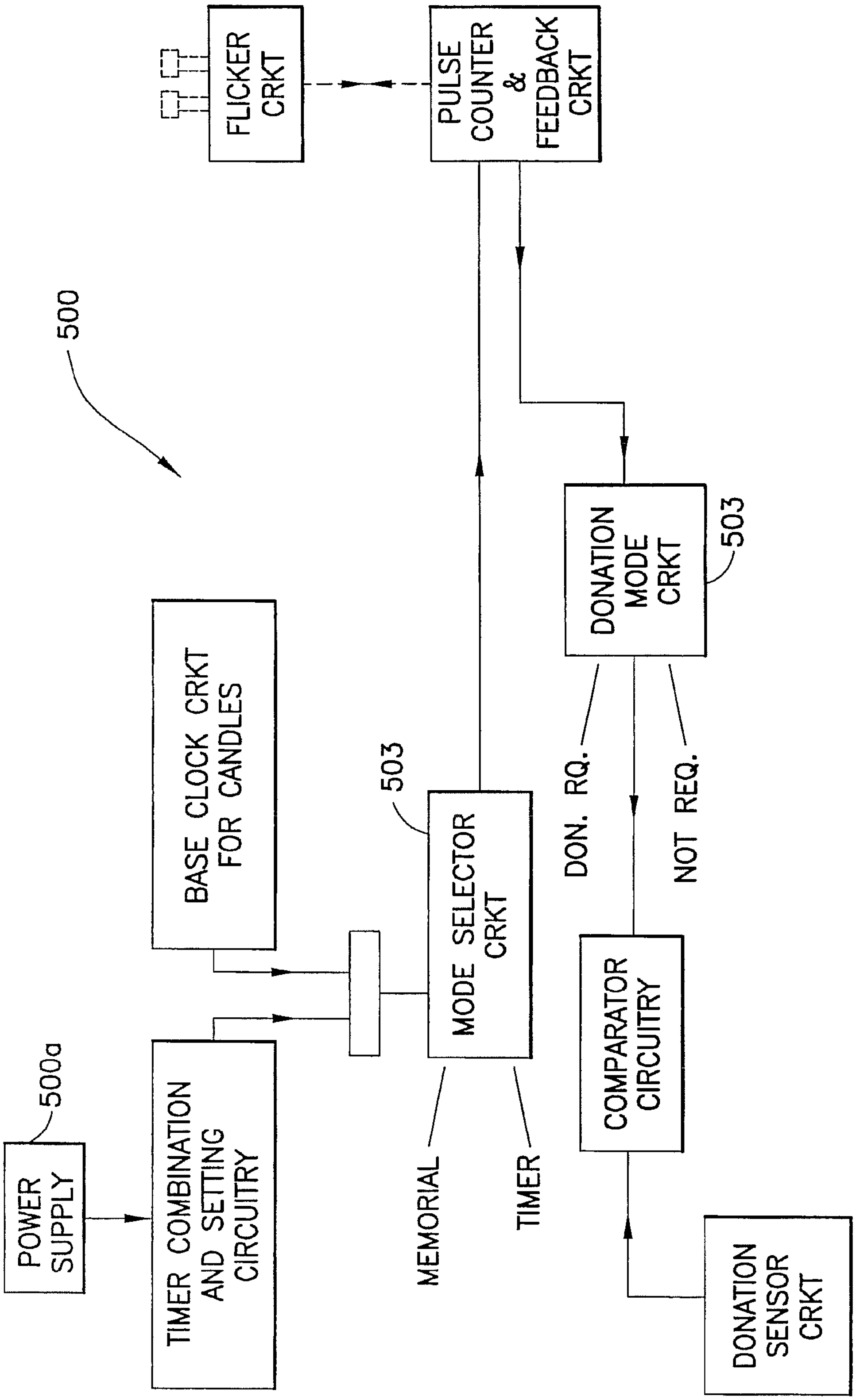
FIG. 18 is a block diagram of the electronic circuitry for the operation of the electronic candle illumination and transaction payment actuation of the electronic candles.

Referring to FIG. 18, there is a block diagram showing the electronic circuitry 500 that permits the user in selecting a transaction mode unit 24, 24*a* or 24*b* (FIG. 20) to make a payment or donation and actuate at least on electronic candle 14 for selective illumination for a prescribed period of time. That is, when the user desires a memorial illumination for a prescribed extended period of time, the user can accordingly make the appropriate payment by one of the 24, 24*a* or 24*b* transaction mode units. Referring to FIGS. 5, 18 and 20, circuitry 500 is an integral component of assembly 501 and contains power supply 500*a*, and is mounted in chassis panel 502. Mode selector circuit and donation mode circuit are mounted as unit 503 (FIG. 5). Chassis panel 502 and assembly 501 are disposed inside of back cover 505 and secured from tampering and further secures collection box 70. Assembly 501 includes manual control knobs or switches to select the particularly monetary transaction mode. Back cover 505 covers the wiring connections and assembly openings on back panel 63 (FIG. 17).

Figure 19:
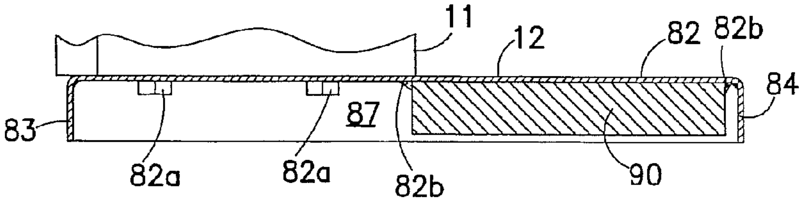
FIG. 19 is an enlarged sectional side view of the support base for the column.
Figure 16:
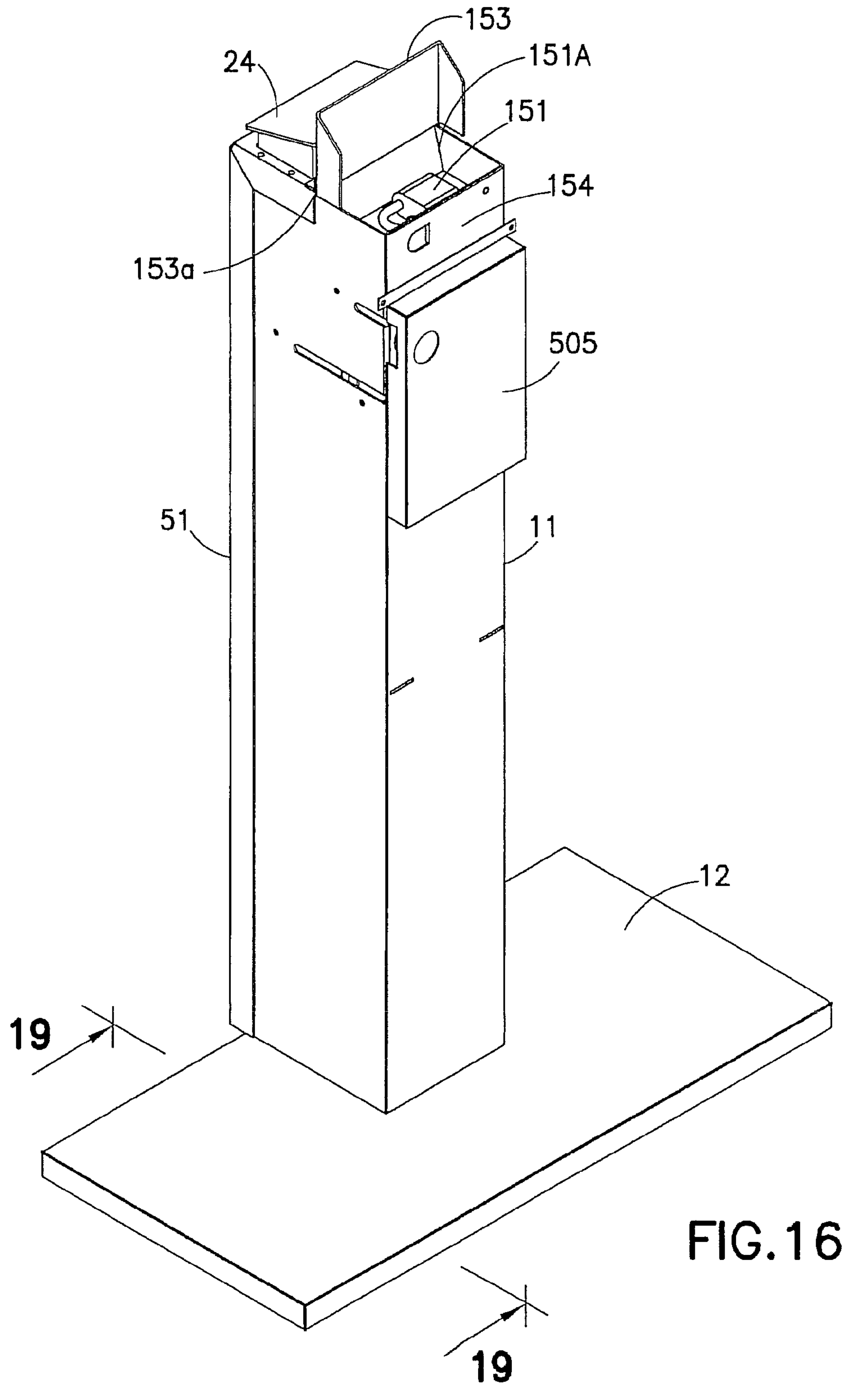
FIG. 16 is a rear perspective view of the universal support column.

FIG. 19 shows the base 12 assembly with frame 82 holding counter weight 90. Frame 82 includes front 83, rear 84, and sides 85-86. Counter weight 90 is rearwardly fixedly disposed from column 11 and adjacent back wall 84. Welded nuts connect frame 82 to base plate 19 column assembly.

The afore-discussed embodiments disclose an assembly in which diverse electronic candle arrays and transaction payment units are readily assembled to a universal support column for readily cost-effectively providing an assembly customized for a specific religious institution, funerary business and memorial institution. The foregoing preferred embodiments are to be considered as being merely illustrative of the invention and not limited by the foregoing description of the invention, which invention is defined by the adjoined claims.

What is claimed is:

1. A jimmy-proof cash collection or donation assembly comprising;

an elongate column, a front panel having opposed side walls; said column further comprises opposed side panels and a back panel, a cash collection box, said column side panels and back comprise a receptacle for removably holding the collection box; and said column further comprises means for receiving cash;

means for mounting the front panel with respect to the column for moving the front panel from an open position disposed away from the column to a closed position, said collection box being disposed in the column in the closed position, said collection box being removably disposed in the receptacle in the column, said collection box being in operable communication with the means for receiving cash; and means for locking said front panel to said column in the closed position; said means for locking said front panel comprises a lock, said lock being disposed in a confined space in said column, and further comprising a cover for selectively enclosing said lock in said column so as to hide the lock from view; whereby the hidden confined lock frustrates attempts to first find and then pry bar the lock in an attempt to pilfer the collected cash secured in the jimmy-proof assembly.

2. The assembly of claim 1, said means for receiving cash further comprises a V-shaped lid assembly, said V-shaped assembly comprises an upper lid and an lower lid, and means for pivotably connecting the lid assembly to the column, whereby the cash is inserted between the lids in a pivoted upwardly disposed position, and then the lids are pivoted downwardly so that the cash falls from between the lids into the collection box, and the upwardly pivoted lids prevent pilfering of the cash in the collection box.

3. The assembly of claim 2, said lid assembly further comprises a hinge, said hinge being operably connected to the one said lid and to the column, whereby after the upper lid is lifted for receiving cash in the lid assembly open position, the hinge, by the weight of lids, causes the V-shaped assembly to pivot downwardly in the lid assembly closed position to secure the cash collected in the collection box.

4. The assembly of claim 2, said collection box comprises an elongate box construction, and further comprises a handle in an upper portion of the box construction.

5. The assembly of claim 4, said means for receiving cash comprises a hinge, said hinge comprises a V-shape in an open position and a U-shape in a closed position.

6. A jimmy-proof cash collection or donation assembly comprising:

an elongate column, a front panel having opposed side walls; said column further comprises opposed side panels and a back panel, a cash collection box, said column side panels and back comprise a receptacle for removably holding the collection box; and said column further comprises means for receiving cash;

means for mounting the front panel with respect to the column for moving the front panel from an open position disposed away from the column to a closed position, said collection box being disposed in the column in the closed position, said collection box being removably disposed in the receptacle in the column, said collection box being in operable communication with the means for receiving cash;

said side panels and side walls comprise respective elongate U-shaped channels and slidably engaging planar portions to enclose the column in the closed position;

means for locking said front panel to said column in the closed position;

said means for locking said front panel comprises a lock.

7. The assembly of claim 6, an openable and closeable cover disposed at the top of the column, said cover when closed provides a flush unitary construction with the column.

8. The assembly of claim 6, said lock being disposed in a confined space in said column, and further comprising a cover for selectively enclosing said lock in said column so as to hide the lock from view; whereby the hidden confined lock frustrates attempts to first find and then pry bar the lock in an attempt to pilfer the collected cash secured in the jimmy-proof assembly.

9. A jimmy-proof cash collection or donation assembly comprising:

(a) a column for enclosing the collection or donation, said column comprising a front panel having side panels, said column further comprises respective side walls, each of the side walls or each of the respective side panels comprise a U-shaped channel or respective planar portion, each said respective U-shaped channel and planar portion are in sliding engagement to enclose the column in a closed position to provide a jimmy-proof construction;

(b) means for locking the side panels to the side walls, said means for locking the panels to the side walls comprise a lock, said lock being disposed so as not to be visible in the column closed position; and (c) means for receiving cash in the column being operably disposed in the column.

10. A jimmy-proof cash collection or donation assembly comprising:

(a) a column for enclosing the collection or donation, said column comprising a front panel having side panels, said column further comprises respective side walls, each of the side walls or each of the respective side panels comprise a U-shaped channel or respective planar portion, each said respective U-shaped channel and planar portion are in sliding engagement to enclose the column in a closed position to provide a jimmy-proof construction;

(b) means for locking the side panels to the side walls, said means for locking the panels to the side walls comprise a lock, said lock being disposed so as not to be visible in the column closed position; and (c) means for receiving cash in the column being operably disposed in the column, wherein the means for receiving the cash comprises a V-shaped lid assembly, said V-shaped assembly comprises an upper lid and an lower lid, and means for pivotably connecting the lid assembly to the column, whereby the cash is inserted between the lids in a pivoted upwardly disposed position, and then the lids are pivoted downwardly so that the cash falls from between the lids into the collection box, and the upwardly pivoted lids prevent pilfering of the cash in the collection box.

11. The assembly of claim 10, said lid assembly further comprises a hinge, said hinge being operably connected to the one said lid and to the column, whereby after the upper lid is lifted for receiving cash in the lid assembly open position, the hinge, by the weight of lids, causes the V-shaped assembly to pivot downwardly in the lid assembly closed position to secure the cash collected in the collection box.

12. A jimmy-proof cash collection or donation assembly comprising:

(a) a column for enclosing the collection or donation, said column comprising a front panel having side panels, said column further comprises respective side walls, each of the side walls or each of the respective side panels comprise a U-shaped channel or respective planar portion, each said respective U-shaped channel and planar portion are in sliding engagement to enclose the column in a closed position to provide a jimmy-proof construction;

(b) means for locking the side panels to the side walls, said means for locking the panels to the side walls comprise a lock, said lock being disposed so as not to be visible in the column closed position; and (c) means for receiving cash in the column being operably disposed in the column further comprising a collection box, said collection box being removably replaceably disposed in the column, and said collection box is disposed below the means for receiving cash.

13. A jimmy-proof cash collection or donation assembly comprising:

(a) a column for enclosing the collection or donation, said column comprising a front panel having side panels, said column further comprises respective side walls, each of the side walls or each of the respective side panels comprise a U-shaped channel or respective planar portion, each said respective U-shaped channel and planar portion are in sliding engagement to enclose the column in a closed position to provide a jimmy-proof construction;

(b) means for locking the side panels to the side walls, said means for locking the panels to the side walls comprise a lock, said lock being disposed so as not to be visible in the column closed position; and (c) means for receiving cash in the column being operably disposed in the column, said column comprises a cover, said lock being disposed behind the cover so as to be hidden from view.

14. The assembly of claim 13, further comprising a collection box, said collection box being removably replaceably disposed in the column, and said collection box is disposed below the means for receiving cash.

15. A jimmy-proof cash collection or donation assembly comprising:

(a) a column for enclosing the collection or donation, said column comprising a front panel having side panels, said column further comprises respective side walls, each of the side walls or each of the respective side panels comprise a U-shaped channel or respective planar portion, each said respective U-shaped channel and planar portion are in pivotable sliding engagement to enclose the column in a closed position to provide a jimmy-proof construction;

(b) means for locking the side panels to the side walls, said means for locking the panels to the side walls comprise a lock operably disposed in the column closed position, said lock being disposed so as not to be visible in the column closed position; and (c) means for receiving cash in the column, being operably disposed in the column.

16. The assembly of claim 15, said column further comprises a cover, said cover being movably connected to the column to a cover closed portion, said lock being disposed behind the cover in the cover closed position so as to be hidden from view.

* * * * *